United States Patent Office 2,819,325
Patented Jan. 7, 1958

2,819,325

PRODUCTION OF AROMATIC HYDROCARBONS

William C. Lanning and Alfred Clark, Bartlesville, Okla., assignors to Phillips Petroleum Company, a corporation of Delaware No Drawing. Application May 25, 1953
Serial No. 357,362

37 Claims. (Cl. 260—673)

This invention relates to the production of aromatic hydrocarbons. In a further aspect this invention relates to the catalytic polymerization of 1-alkynes to form liquid aromatic hydrocarbons. In a still further aspect this invention relates to the production of benzene and alkylbenzenes.

It is well known in the art that liquid aromatic hydrocarbons, e. g., benzene and alkylbenzenes, may be produced by the thermal condensation of acetylene at appropriate temperatures, for example, 1000 to 1200° F. This method and other known methods for effecting condensation or polymerization of acetylene to produce liquid aromatic hydrocarbons have been found unsatisfactory, one reason being that the product is accompanied by excessive carbon and tar formation. Another unfortunate incident of the thermal condensation of acetylene has been the decomposition of acetylene as well as the decomposition and dehydrogenation of the products from this process. A further characteristic of the thermal condensation of acetylene is that the composition of the end products varies widely with changes in reaction conditions.

Economical means for the production of liquid aromatic hydrocarbons, especially benzene and alkylbenzenes, are of significance because of the increasing demand for these raw materials by many industries. Catalytic reforming is the principal process now being employed by the petroleum industry to alleviate the shortage of benzene.

An object of our invention, therefore, is to provide a process for the manufacture of aromatic hydrocarbons.

A further object is to provide a process for the manufacture of liquid aromatic hydrocarbons from 1-alkynes.

A still futher object is to provide a process for the manufacture of benzene and alkylbenzenes by the catalytic polymerization of 1-alkynes at low temperatures. Other objects of this invention will be apparent to those skilled in the art from the accompanying disclosure and discussion.

We have discovered that liquid aromatic hydrocarbons, comprising principally benzene and alkylbenzenes, are obtained by the polymerization of 1-alkynes using a chromium oxide containing catalyst comprising a catalyst support which is at least one member selected from the group consisting of silica, alumina, zirconia, titania and siliceous natural clays over a wide range of temperature and pressure. It is to be noted that ours is a low temperature process and, in accordance with a preferred embodiment of our invention, 1-alkynes in a hydrocarbon diluent, under pressure sufficient to maintain liquid phase, are passed over the above described catalyst at temperatures up to 350° F., or higher, to produce high yields of liquid aromatic hydrocarbons, principally benzene and alkylbenzenes. This unexpected result, that liquid aromatic hydrocarbons, principally benzene and alkylbenzenes are produced by the polymerization of 1-alkynes, rather than the formation of an open-chain type polymer, is further notable because of the high selectivity of our process as to specific products which may be obtained. The scope and further advantages of our process will be more apparent from the following discussion and examples.

In accordance with our invention, alkynes corresponding to the formula HC≡CR are polymerized in the presence of the above described catalyst to form liquid aromatic hydrocarbon polymers and copolymers. R in the above formula can be a substituent selected from the group consisting of hydrogen, alkyl, alkenyl, cycloalkyl, aryl, alkaryl, and aralkyl. We have successfully converted 1-hexyne to liquid aromatic hydrocarbons, and, therefore, no absolute upper limit on the number of carbon atoms in said alkynes can be properly made. Preferably, however, where the substituent for R is other than hydrogen, R is normal alkyl and, still more preferably, said alkyne will have from 3 to 8 carbon atoms when R is normal alkyl. Specific examples of alkynes corresponding to the above formula which are effective in our process are methylacetylene, 1-hexyne, 1-octyne, 3-methyl-1-butyne, 3,3-dimethyl-1-butyne, vinylacetylene, 4-penten-1-yne, 3-penten-1-yne, 6-hepten-1-yne, 4-hepten-1-yne, 3-hepten-1-yne, cyclopentylacetylene, cyclohexylacetylene, (4-methylcyclohexyl)acetylene phenylacetylene, 1-naphthylacetylene, 4-tolylacetylene, benzylacetylene, and the like.

The concentration of said alkynes in the feed stock to be polymerized can vary up to 100 percent of the feed stock. Vapor phase polymerization of a pure 1-alkyne monomer is effective according to our process. Generally, it is preferred that said alkynes be dissolved in a hydrocarbon diluent so that the concentration of said alkynes falls in the range from 0.5 to 10 weight percent of the feed stock. The polymerizations of our invention are exothermic and, therefore, practically speaking, the economic problem of the removal of the heat of reaction will control, to some extent, the concentration of said alkynes in the feed stock. It is most often preferred that the concentration of said alkynes in the feed stock be in the range from 1 to 4 weight percent.

The presence of ethylene in the feed stock, while not harmful to the overall conversion obtained, is conducive to the formation of solid products, which tend to clog the catalyst, particularly in the lower temperature ranges. Therefore, preferably there should be only a small amount of ethylene in the feed.

The diluents which can be used comprise hydrocarbons, generally, which are inert and liquid under the conditions of the reaction. These hydrocarbon diluents are selected from the group consisting of paraffins, cycloparaffins and aromatics and a liquid hydrocarbon selected to be a diluent should have a boiling point such that it is separable by distillation from the liquid aromatic hydrocarbons produced by our process. In general, we prefer as a diluent aliphatic hydrocarbons with from 3 to 12 carbon atoms per molecule. In this connection, the use of higher boiling diluents and operation in the higher temperature ranges has the advantage of reducing the difficulty due to solid product formation on the catalyst when ethylene is present in the feed stream. Furthermore, aromatic hydrocarbons, e. g., benzene are the least preferred as diluents since they tend to reduce the product yield.

As was stated heretofore, the pressure under which our process operates may vary widely. In general, it is preferred that a pressure sufficient to maintain liquid phase operation is utilized. Such a pressure will range up to 1000 pounds per square inch absolute and will generally fall in the range from 300 to 700 pounds per square inch absolute. It is most frequently preferred that the pressure for the process be approximately 600 pounds per square inch.

A most notable feature of our process is the wide range of temperature under which the reaction proceeds to give high yields and to allow a high selectivity of liquid aromatic hydrocarbon products. We have found that the temperature generally can be in the range from below −50° F. to above 350° F. A preferred temperature range is from 0° to 350° F. and it is most frequently preferred that the temperature fall in the range from 50° to 200° F.

The catalyst of our process is chromium oxide deposited on a support which is at least one member selected from the group consisting of silica, alumina, zirconia, titania and siliceous natural clays. Detailed methods for the preparation of this catalyst comprising the above named supports, except zirconia and titania, can be found in the copending application of John Paul Hogan and Robert L. Banks, Serial No. 333,576, filed January 27, 1953, now abandoned.

In said copending application of Hogan and Banks, Serial No. 333,576, it is stated that the supported chromium oxide catalyst is usually prepared by impregnation of particulate silica, alumina, or silica-alumina with a solution of chromium oxide or a compound convertible to the oxide by calcination, followed by drying and activation of the composite at a temperature in the range of 750 to 1500° F. for a period of 3 to 10 hours or more. The catalyst may be prepared using chromium trioxide, chromium nitrate, chromium chloride, chromium sulfate and other soluble salts of chromium. Impregnation with chromium trioxide ($CrO_3$) is preferred, although chromium nitrate may be used with similar results. It is believed that the catalyst prepared from the chloride and sulfate is at least partially converted to oxide during activation. The amount of chromium oxide in the catalyst may range from 0.1 to 10 or more weight percent of the support. The preferred support is a silica-alumina composite containing a predominate portion of silica and a minor portion of alumina. One support that has been found particularly effective is a coprecipitated 90 percent silica-10 percent alumina support. It is found that steam treatment of this support, i. e., silica-alumina, or silica without appreciable alumina, improves the activity and life of the catalyst composite in a polymerization reaction. A silica support of lower surface area and larger pore size is a better support than one having extremely high surface area and small pore size. Chromium oxide-silica catalyst tends to become deactivated more quickly than chromium oxide-silica-alumina catalyst. Chromium oxide-alumina catalyst has about one-third the activity of a chromium oxide-silica-alumina catalyst. It is believed necessary for some of the chromium to be in the hexavalent state to act as an active promoter or catalyst for the polymerization reaction of the invention. It is preferred to use catalyst in which the amount of hexavalent chromium is at least 0.1 percent of the weight of the catalyst composite based on the water-soluble chromium present.

The preferred steam activation of the silica-alumina base of the catalyst is conducted at a temperature of approximately 1200° F. for 10 hours utilizing 5 volume percent steam admixed with 95 volume percent air. In the steam activation treatment, the temperature may be varied from 1100 to 1300° F. and the steam content of the steam-air mixture may range from about 3 to 10 percent. The time of treatment may vary from about 4 to 15 hours.

In said copending application of Hogan and Banks, Serial No. 333,576, it is further stated that treatment of chromium oxide catalyst with hydrogen for four hours at 920° F. to reduce hexavalent chromium to the trivalent state gave a catalyst which was almost completely inactive and which produced no appreciable high polymer; this indicates that hexavalent chromium is essential.

The zirconia support can be prepared by precipitation of zirconium hydroxide by the reaction of zirconyl nitrate with a base, preferably ammonium hydroxide, the precipitated zirconia then being dried by heat. The titania support can be similarly prepared by precipitation of titanium hydroxide by the reaction of titanium oxalate with a base, preferably ammonium hydroxide, the precipitated titania then being dried by heat. Impregnation of the thus prepared supports with chromium oxide can be accomplished by soaking the support in aqueous chromium trioxide, filtering and drying.

The siliceous natural clays which can be used as catalyst supports are activated by multiple washes with a dilute solution of an acid, such as sulfuric acid, and they comprise the clays montmorillonite, bentonite, halloysite, and the like.

A preferred catalyst composition comprises chromium oxide deposited on a silica-alumina support, wherein the content of chromium as oxide in said catalyst is in the range from 0.1 to 10 weight percent. More frequently the range of chromium as oxide content in said catalyst is preferred to be from 0.3 to 3.0 weight percent. Where the preferred catalyst support of silica-alumina is used, we prefer the range of its ingredients to be from 85 to 98 weight percent silica, and the remainder, alumina. Our most preferred catalyst support consists of 90 weight percent silica and 10 weight percent alumina.

We have found that the temperature at which the catalyst is activated has only a small effect on the activity or the efficiency of the catalyst. In general, activation of the catalyst in air will be satisfactory if carried out at a temperature above 600° F. A preferred temperature range for the catalyst activation is from 600 to 1600° F. and it is frequently preferred that the range of catalyst activation temperature be from 900 to 1100° F.

We have found that the feed rate for the polymerization reactions of our invention may vary to a considerable extent. In general it is preferred that the feed rate be in the range from 0.1 to 15 liquid hourly space velocity (LHSV). It is more frequently preferred that the feed rate be in the range from 1 to 4 LHSV.

The following examples present data which illustrate and clarify our invention, but they should not be interpreted so as to unnecessarily restrict or limit our invention.

EXAMPLE I

Data are presented below in Table 1 for a low temperature liquid phase process to produce benzene by the polymerization of acetylene. A chromium oxide deposited on silica-alumina catalyst was used. In runs 2, 3, 5 and 7 the catalyst contained approximately 2.5 weight percent chromium as oxide. In runs 1, 4 and 6 the catalyst contained 0.94 weight percent chromium as oxide. The catalyst was activated in air at 1300° F. in runs 2, 3, 5 and 7 and was activated in air at 950° F. in runs 1, 4, and 6. The diluent in all of the runs was isobutane with the exception of run No. 7 in which the diluent was isopentane. The pressure in all of the runs was approximaetly 600 pounds per square inch absolute.

Table 1.—Conversion of acetylene to benzene effect of operating temperature

| Run No. | 1 | 2 | 3 | 4 | 5 | 6 | 7 |
|---|---|---|---|---|---|---|---|
| Run Temp., °F. | −2 | 55 | 120 | 155 | 197 | 248 | 347 |
| Mol Percent Acetylene in Feed | 3.5 | 2.9 | 3.2 | 2.6 | 3.9 | | 2.9 |
| LHSV | 3.1 | 2.5 | 2.5 | 2.6 | 2.8 | 2.7 | 2.2 |
| Acetylene Conv., Percent | 88.5 | 100 | 100 | 100 | 100 | 100 | 89.5 |
| Wt. Percent Acetylene to: | | | | | | | |
| Benzene | 77.5 | 78.4 | 74.4 | 80.5 | 74.5 | 69.5 | 47.0 |
| Other liquids | 16.3 | 8.2 | 8.2 | 12.3 | 6.6 | 22.2 | 13.7 |
| Solid Polymer | 6.3 | 13.4 | 17.4 | 7.2 | 18.9 | 8.3 | 39.3 |
| Benzene in Liq. Prod., Percent | 82.8 | 91.5 | 90.6 | 87.1 | 92.2 | 75.8 | 86.5 |

EXAMPLE II

Table 2 below presents data for 3 runs to show the effect of varying feed rates (LHSV). In these runs the process of Example I was adhered to.

Table 2

| Run No. | Temp., °F. | Mol Percent Acetylene in Feed | Feed Rate (LHSV) | Hours on Stream | Conversion of Acetylene, Percent | Volume Percent Benzene in Liquid Product | Weight Percent of Acetylene Converted to Solid Polymer on Catalyst |
|---|---|---|---|---|---|---|---|
| 1 | 105 | 3.5 | 6.5 | 2 | 100 | | |
| | | | | 4 | 98 | 92.6 | 13.4 |
| 2 | 108 | 3.0 | 12.6 | 3/4 | 100 | | |
| | | | | 1 1/2 | 97 | | |
| | | | | 2 1/4 | 92.3 | 90.8 | 14.9 |
| 3 | 210 | 3.6 | 12.5 | 3/4 | 100 | | |
| | | | | 1 1/2 | 99.6 | | |
| | | | | 2 1/4 | 94.2 | 90.8 | 10.6 |

EXAMPLE III

Methylacetylene was successfully polymerized to liquid aromatic hydrocarbons by the method of our invention. The catalyst was chromium oxide deposited on a silica-alumina support, and was activated in air at 1300° F. and contained 2.5 weight percent chromium as oxide. The reaction was effected at 196° F., at a pressure sufficient to maintain liquid phase, LHSV of 2.8 and the feed stock comprised 2.3 mol percent methylacetylene in isobutane as a diluent. An approximate composition of the liquid product was 75 percent 1,2,4-trimethylbenzene, 14 percent 1,3,5-trimethylbenzene, and 11 percent paraffins.

EXAMPLE IV

Methylacetylene and acetylene were copolymerized to produce liquid aromatic hydrocarbons. In a run under essentially the same conditions as in Example III, but with a feed comprising 1.6 mol percent acetylene and 1.2 mol percent methylacetylene, the liquid product comprised the following, listed in descending order of their abundance: toluene (over 50 percent), xylenes (all three isomers with the meta-isomer predominating), benzene and 1,2,4-trimethylbenzene.

EXAMPLE V

Acetylene was polymerized to produce benzene over a chromium oxide deposited on silica-zirconia catalyst. The catalyst contained 2.5 weight percent chromium as oxide, and the support contained approximately 13 weight percent zirconia. The catalyst was activated in air at 932° F. The feed contained 4.4 mol percent acetylene in isobutane as a diluent. The reaction was effected at 200° F., at a pressure sufficient to maintain liquid phase and a LHSV of 3.9. The conversion of acetylene was 98 percent, and of the acetylene converted, 69.5 weight percent was benzene, 15.6 weight percent was other liquid hydrocarbons, and 14.9 weight percent was solid polymer deposited on the catalyst.

EXAMPLE VI

Acetylene was polymerized to produce benzene over a chromium oxide deposited on an acid-activated halloysite clay catalyst. The catalyst contained approximately 2 to 3 percent chromium as oxide and was prepared by impregnating 100 milliliters of the clay with 150 milliliters of an 0.8 molal solution of chromium trioxide and then activating the catalyst at 950° F. for five hours in dry air. An 8½ run was made with a feed containing 3.0 mol percent acetylene in isobutane as a diluent, a reaction temperature of 200° F., at a pressure of 600 pounds per square inch gauge and a LHSV of 3.2. The average conversion of the acetylene over the run was 94 percent and the benzene content of the liquid product was at least 50 percent.

EXAMPLE VII

Acetylene was polymerized to produce benzene over a chromium oxide deposited on silica catalyst. The catalyst contained approximately 2 to 3 percent chromium as oxide and was prepared by impregnating 250 milliliters of silica gel with 250 milliliters of an 0.8 molal solution of chromium trioxide and then activating the catalyst at 950° F. for five hours in dry air. A 9 hour run was made with a feed containing 3.3 mol percent of acetylene in isobutane as a diluent, a reaction temperature of 200° F., at a pressure of 600 pounds per square inch gauge and a LHSV of about 2.8. The average conversion of the acetylene over the run was 97 percent and the benzene content of the liquid product was approximately 80 percent.

EXAMPLE VIII

Acetylene and phenylacetylene were copolymerized in the presence of a chromium oxide deposited on silica-alumina catalyst. The feed was dissolved in isobutane as a diluent, the reaction was effected at 197° F. and 600 pounds per square inch absolute, and a liquid product containing biphenyl was obtained.

EXAMPLE IX

Acetylene was polymerized to produce benzene over a chromium oxide deposited on alumina catalyst. The catalyst contained approximately 2 to 3 percent chromium as oxide, the reaction was effected at 198° F., 600 pounds per square inch gauge, a LHSV of 3, and the acetylene was dissolved in isobutane as a diluent.

While our invention has been described and illustrated in terms of preferred embodiments thereof, those skilled in the art will appreciate that many variations may be made without departing from the spirit and scope of our invention as defined herein.

We claim:

1. A process for producing aromatic hydrocarbons which comprises polymerizing an alkyne selected from the group consisting of acetylene and substituted acetylenes wherein a hydrogen atom is replaced by a substituent selected from the group consisting of alkyl, alkenyl, cycloalkyl, aryl, alkaryl and aralkyl radicals, in the presence of a catalyst consisting essentially of chromium oxide on a support comprising at least one member selected from the group consisting of silica, alumina, zirconia, titania and siliceous natural clay under polymerizing conditions wherein the reaction temperature is below about 350° F., said chromium oxide containing hexavalent chromium amounting to at least 0.1 weight percent of the catalyst composite based on the water-soluble chromium present.

2. A process according to claim 1 wherein said alkyne is acetylene.

3. A process according to claim 1 wherein said alkyne has a hydrogen atom replaced by a normal alkyl radical and said alkyne has from 3 to 8 carbon atoms.

4. A process according to claim 3 wherein said catalyst is chromium oxide on a support consisting of silica-alumina.

5. A process according to claim 3 wherein said catalyst is chromium oxide on a support consisting of silica-zirconia.

6. A process according to claim 3 wherein said catalyst is chromium oxide on a support consisting of silica.

7. A process according to claim 3 wherein said catalyst is chromium oxide on a support consisting of a siliceous natural clay.

8. A process according to claim 3 wherein said catalyst is chromium oxide on a support consisting of alumina.

9. A process for polymerizing an alkyne selected from the group consisting of acetylene and substituted acetylenes wherein a hydrogen atom is replaced by a substituent selected from the group consisting of alkyl, alkenyl, cycloalkyl, aryl, alkaryl and aralkyl radicals to produce an aromatic hydrocarbon-containing product which comprises polymerizing a feed comprising said alkyne admixed with a hydrocarbon diluent, said diluent being inert and liquid under the conditions of the reaction and being separable by distillation from said aromatic hydrocarbon-containing product, selected from the group consisting of paraffins, cycloparaffins and aromatics, in the presence of a catalyst consisting essentially of chromium oxide on a support comprising at least one member selected from the group consisting of silica, alumina, zirconia, titania and siliceous natural clay under polymerizing conditions wherein the reaction temperature is below about 350° F., said chromium oxide containing hexavalent chromium amounting to at least 0.1 weight percent of the catalyst composite based on the water-soluble chromium present.

10. A process for polymerizing an alkyne selected from the group consisting of acetylene and substituted acetylenes wherein a hydrogen atom is replaced by a substituent selected from the group consisting of alkyl, alkenyl, cycloalkyl, aryl, alkaryl and aralkyl radicals to produce a liquid aromatic hydrocarbon homopolymer which comprises polymerizing said alkyne in the presence of a catalyst consisting essentially of chromium oxide on a support comprising at least one member selected from the group consisting of silica, alumina, zirconia, titania and siliceous natural clay under polymerizing conditions wherein the reaction temperature is below about 350° F., said chromium oxide containing hexavalent chromium amounting to at least 0.1 weight percent of the catalyst composite based on the water-soluble chromium present.

11. A process for copolymerizing alkynes selected from the group consisting of acetylene and substituted acetylenes wherein a hydrogen atom is replaced by a substituent selected from the group consisting of alkyl, alkenyl, cycloalkyl, aryl, alkaryl and aralkyl radicals to produce liquid aromatic hydrocarbon copolymers which comprises copolymerizing said alkynes in the presence of a catalyst consisting essentially of chromium oxide on a support comprising at least one member selected from the group consisting of silica, alumina, zirconia, titania and siliceous natural clay under copolymerizing conditions wherein the reaction temperature is below about 350° F., said chromium oxide containing hexavalent chromium amounting to at least 0.1 weight percent of the catalyst composite based on the water-soluble chromium present.

12. A process according to claim 11 wherein said alkynes are substituted acetylenes wherein a hydrogen atom is replaced by a normal alkyl radical and said alkynes have from 3 to 8 carbon atoms.

13. A process for polymerizing an alkyne selected from the group consisting of acetylene and substituted acetylenes wherein a hydrogen atom is replaced by a substituent selected from the group consisting of alkyl, alkenyl, cycloalkyl, aryl, alkaryl and aralkyl radicals to produce a liquid aromatic hydrocarbon homopolymer which comprises polymerizing said alkyne, admixed with a hydrocarbon diluent selected from the group consisting of paraffins, cycloparaffins and aromatics and being inert and liquid under the conditions of the reaction and separable by distillation from said liquid aromatic hydrocarbon homopolymer, in the presence of a catalyst consisting essentially of chromium oxide on a support comprising at least one member selected from the group consisting of silica, alumina, zirconia, titania and siliceous natural clay under polymerizing conditions wherein the reaction temperature is below about 350° F., said chromium oxide containing hexavalent chromium amounting to at least 0.1 weight percent of the catalyst composite based on the water-soluble chromium present.

14. A process according to claim 13 wherein said alkyne is acetylene and said homopolymer is benzene.

15. A process according to claim 13 wherein said diluent is an aliphatic paraffin having from 3 to 12 carbon atoms.

16. A process according to claim 13 wherein said polymerizing conditions comprise a reaction temperature in the range from about −50 to about 350° F. and at pressure up to 1000 pounds per square inch absolute.

17. A process for copolymerizing alkynes, selected from the group consisting of acetylene and substituted acetylenes wherein a hydrogen atom is replaced by a substituent selected from the group consisting of alkyl, alkenyl, cycloalkyl, aryl, alkaryl and aralkyl radicals to produce liquid aromatic hydrocarbon copolymers which comprises copolymerizing said alkynes, admixed with a hydrocarbon diluent selected from the group consisting of paraffins, cycloparaffins and aromatics and being inert and liquid under the conditions of the reaction and separable by distillation from said liquid aromatic copolymers, in the presence of a catalyst consisting essentially of chromium oxide on a support comprising at least one member selected from the group consisting of silica, alumina, zirconia, titania and siliceous natural clay under copolymerizing conditions wherein the reaction temperature is below about 350° F., said chromium oxide containing hexavalent chromium amounting to at least 0.1 weight percent of the catalyst composite based on the water-soluble chromium present.

18. A process according to claim 17 wherein said diluent is an aliphatic paraffin having from 3 to 12 carbon atoms.

19. A process according to claim 17 wherein said polymerizing conditions comprise a reaction temperature in the range from about −50 to about 350° F., and at a pressure up to 1000 pounds per square inch absolute.

20. A process for producing aromatic hydrocarbons which comprises polymerizing an alkyne selected from the group consisting of acetylene and substituted acetylenes wherein a hydrogen atom is replaced by a substituent selected from the group consisting of alkyl, alkenyl, cycloalkyl, aryl, alkaryl and aralkyl radicals in the presence of a catalyst consisting essentially of chromium oxide on a silica-alumina support wherein the reaction temperature is below about 350° F., said chromium oxide containing hexavalent chromium amounting to at least 0.1 weight percent of the catalyst composite based on the water-soluble chromium present.

21. A process according to claim 20 wherein said catalyst contains chromium as oxide in the range from 0.1 to 10 weight percent.

22. A process according to claim 20 wherein said catalyst contains chromium as oxide in the range from 0.3 to 3.0 weight percent.

23. A process according to claim 22 wherein said silica-alumina support contains silica in the range from 85 to 98 weight percent and the remainder, alumina.

24. A process according to claim 22 wherein said silica-alumina support contains 90 weight percent silica and 10 weight percent alumina.

25. A process for polymerizing an alkyne selected from the group consisting of acetylene and substituted acetylenes wherein a hydrogen atom is replaced by a substituent selected from the group consisting of alkyl, alkenyl, cycloalkyl, aryl, alkaryl and aralkyl radicals to produce a liquid aromatic hydrocarbon-containing product, which comprises polymerizing a feed, comprising said alkyne admixed with an aliphatic paraffin diluent having from 3 to 12 carbon atoms per molecule, in the presence of a catalyst consisting essentially of chromium oxide deposited on a silica-alumina support wherein the chromium as oxide is present in the range of from 0.1 to 10 percent by weight, said chromium oxide containing hexavalent chromium amounting to at least 0.1 weight percent of the catalyst composite based on the water soluble chromium present, at a temperature in the range from 0° F. to 350° F., at a pressure of up to 1000 pounds per square inch absolute, and wherein the feed rate is in the range from 0.1 to 15 liquid hourly space volumes.

26. A process for the manufacture of a liquid aromatic hydrocarbon-containing product comprising the polymerization of an alkyne selected from the group consisting of acetylene and substituted acetylenes wherein a hydrogen atom is replaced by a substituent selected from the group consisting of alkyl, alkenyl, cycloalkyl, aryl, alkaryl and aralkyl radicals, said alkyne being admixed with an aliphatic paraffin diluent having from 3 to 12 carbon atoms per molecule, by polymerizing said alkyne and diluent in the presence of a catalyst consisting essentially of chromium oxide deposited on a silica-alumina support, wherein said catalyst contains chromium as oxide in the range of 0.1 to 10 percent by weight, said chromium oxide containing hexavalent chromium amounting to at least 0.1 weight percent of the catalyst composite based on the water soluble chromium present, at a temperature in the range of 50 to 200° F., at a pressure in the range from 300 to 700 pounds per square inch absolute and at a feed rate of 1 to 4 liquid hourly space volumes.

27. A process according to claim 26 wherein said alkyne is acetylene and said diluent is isobutane.

28. A process according to claim 26 wherein said alkyne is methylacetylene and said diluent is isobutane.

29. A process according to claim 26 wherein said alkyne is 1-hexyne and said diluent is isobutane.

30. A process for the manufacture of benzene comprising the polymerization of acetylene by a method which comprises polymerizing an admixture of 0.5 to 10 mol percent of acetylene in isobutane as a diluent in the presence of a catalyst consisting essentially of chromium oxide deposited on a silica-alumina support, said catalyst containing chromium as oxide in the range from 0.1 to 10 percent by weight, said chromium oxide containing hexavalent chromium amounting to at least 0.1 weight percent of the catalyst composite based on the water soluble chromium present, at a temperature in the range of 50 to 200° F., at a pressure in the range from 300 to 700 pounds per square inch absolute and a feed rate of 1 to 4 liquid hourly space volumes.

31. A process for the manufacture of benzene comprising the polymerization of acetylene by a method which comprises polymerizing an admixture of 1 to 4 mol percent of acetylene in isobutane as a diluent in the presence of a catalyst consisting essentially of chromium oxide deposited on a silica-alumina support, the range of chromium as oxide content in said catalyst being from 0.3 to 3.0 weight percent, said chromium oxide containing hexavalent chromium amounting to at least 0.1 weight percent of the catalyst composite based on the water soluble chromium present, at a temperature in the range from 50 to 200° F. at a pressure of approximately 600 pounds per square inch absolute and at a feed rate of 1 to 4 liquid hourly space volumes.

32. A process according to claim 31 wherein said catalyst support comprises silica in the range from 85 to 98 weight percent, and the remainder alumina.

33. A process according to claim 31 wherein said catalyst support contains 90 weight percent silica and 10 weight percent alumina.

34. A process for the manufacture of 1,2,4-trimethylbenzene comprising the polymerization of methylacetylene which comprises polymerizing an admixture of 1 to 4 mol percent of methylacetylene in isobutane as a diluent in the presence of a catalyst consisting essentially of chromium oxide deposited on a silica-alumina support, the range of chromium as oxide content in said catalyst being from 0.3 to 3.0 weight percent, said chromium oxide containing hexavalent chromium amounting to at least 0.1 weight percent of the catalyst composite based on the water soluble chromium present, at a temperature in the range from 50 to 200° F., at a pressure sufficient to maintain the isobutane in liquid phase and at a feed rate of 1 to 4 liquid hourly space volumes.

35. A process for the manufacture of alkylbenzenes which comprises the copolymerization of at least two alkynes selected from the group consisting of acetylene and substituted acetylenes wherein a hydrogen atom is replaced by a substituent selected from the group consisting of alkyl, alkenyl, cycloalkyl, aryl, alkaryl and aralkyl radicals, said alkynes being admixed with a hydrocarbon diluent, said diluent being inert and liquid under the conditions of the reaction and being separable from said alkylbenzenes by distillation and selected from the group consisting of paraffins, cycloparaffins and aromatics, said alkynes being copolymerized in the presence of a catalyst consisting essentially of chromium oxide deposited on a support selected from the group consisting of silica, alumina, zirconia, titania and siliceous natural clay, said catalyst containing chromium as oxide in the range from 0.1 to 10 weight percent, said chromium oxide containing hexavalent chromium amounting to at least 0.1 weight percent of the catalyst composite based on the water soluble chromium present, at a temperature ranging from about −50 to about 350° F., and a pressure up to 1000 pounds per square inch absolute.

36. A process according to claim 35 wherein said alkynes are methyl acetylene and acetylene, wherein said diluent is isobutane, wherein said catalyst contains chromium as oxide in the range from 1 to 4 weight percent on a silica-alumina support, said chromium oxide containing hexavalent chromium amounting to at least 0.1 weight percent of the catalyst composite based on the water soluble chromium present, wherein said temperature was in the range from 50 to 200° F. and said pressure was sufficient to maintain the isobutane in liquid phase.

37. A process for producing aromatic hydrocarbons which comprises copolymerizing phenylacetylene and acetylene in the presence of a catalyst consisting essentially of chromium oxide deposited on a silica-alumina support under polymerizing conditions wherein the reaction temperature is below about 350° F., said chromium oxide containing hexavalent chromium amounting to at least 0.1 weight percent of the catalyst composite based on the water-soluble chromium present.

(References on following page)

References Cited in the file of this patent

UNITED STATES PATENTS

| | | |
|---|---|---|
| 2,175,339 | Carter | Oct. 10, 1939 |
| 2,217,011 | Grosse et al. | Oct. 8, 1940 |
| 2,397,301 | Vesterdal | Mar. 26, 1946 |
| 2,470,166 | Hetzel et al. | May 17, 1949 |
| 2,554,275 | Smith | May 22, 1951 |
| 2,629,752 | Craig | Feb. 24, 1953 |

OTHER REFERENCES

Fuzio (Japanese): 109,263, Jan. 22, 1935 (cited by Chem. Abstracts (1935), vol. 29, page 3692).

(Japanese): 163,150, Mar. 23, 1944 (cited from Chem. Abstracts (1947), vol. 41, page 5140).

Johnson and Swann: Industrial and Engineering Chemistry, vol. 38, No. 10, October 1946, pages 990–996.

Horwitz (German): 205,705, Jan. 11, 1909 (incorrect number cited on page 980 of Berkman et al. "Catalysis," published by Reinhold Publishing Corp., New York, N. Y. (1940)).